United States Patent Office 3,453,335
Patented July 1, 1969

3,453,335
CHLORINATION
William H. Starnes, Jr., Baytown, Tex., assignor to Esso Research and Engineering Company
No Drawing. Filed Nov. 12, 1965, Ser. No. 507,546
Int. Cl. C07c *39/24, 87/60, 43/02*
U.S. Cl. 260—623   10 Claims

ABSTRACT OF THE DISCLOSURE

Chlorinated compounds are prepared by chlorinating an aromatic hydrocarbon or alkyl, hydroxy or amino substituted aromatic hydrocarbon with hydrogen chloride in the presence of t-alkyl hydroperoxide having 4 to 20 carbon atoms in the alkyl group at a temperature from about 0° to 100° C.

---

The present invention is directed to introduction of chlorine into an organic molecule. More particularly, the invention is concerned with chlorinating an unsaturated compound. In its more specific aspects, the invention is directed to chlorinating an unsaturated compound having sites susceptible to chlorination.

The present invention may be briefly described as a method for chlorinating an unsaturated compound having sites susceptible to chlorination in which a compound is treated in the presence of hydrogen chloride either in the presence or absence of a solvent with a t-aliphatic hydroperoxide to form a chlorinated derivative of the compound following which the chlorinated derivative is recovered such as by evaporation of the solvent where one is used, or by evaporation of unreacted, unsaturated compounds.

The unsaturated compound which forms the feed stock of the present invention may be selected from a large number of such unsaturated compounds illustrated by way of example, but not by way of limitation, by phenol, cresol, xylenol, anisole, and amines, such as aniline, toluidine, and xylidine, and aromatic hydrocarbons, such as benzene, toluene, xylene, cumene and the like. As a general statement the aromatic hydrocarbons may suitably boil within the range from about 80° C. to about 300° C. When aromatic hydrocarbons form the feed stock, an aromatic hydrocarbon fraction may be employed since it is unnecessary to have the purified aromatic hydrocarbon, although such is preferred.

A solvent may be used in the present invention. As illustrative of such solvents are aromatic hydrocarbons, such as exemplified above, when the unsaturated compound is other than an aromatic hydrocarbon. Other solvents may be paraffinic hydrocarbons boiling within the range of about 60° C. to about 300° C., naphthenic hydrocarbons, chlorinated hydrocarbons such as, but not limited to, chloroform, carbon tetrachloride, perchloroethylene, methylene chloride, nitrobenzene, and the like.

The present invention may be conducted at temperatures within the range from about 0° C. to about 100° C. with a preferred temperature range from about 15° C. to about 40° C. Ordinary room temperatures of about 25° C. may be employed.

It has not been known heretofore that hydrochloric acid could be used at temperatures within the range of about 0° C. to about 100° C. to introduce chlorine into organic molecules since, ordinarily, use of molecular chlorine or rather expensive reagents such as hypochlorous acid, alkyl hypochlorites, sulfuryl chloride, thionyl chloride, N-chlorosuccinimide, and the like, has been necessary to accomplish such reaction. The use of hydrochloric acid as a chlorinating agent is particularly desirable from a commercial standpoint in view of the relative cheapness of this material, but heretofore the only practical method involving use of hydrochloric acid has been the so-called "Deacon" process which is ordinarily conducted in the vapor phase at very high temperatures in excess of 400° C. in the presence of a catalyst such as copper and utilizes mixtuers of hydrogen chloride, oxygen and the hydrocarbon which is to be chlorinated.

The present invention obviates the necessity of high temperatures and the use of expensive reagents and is a great step forward in the art. The present invention involves the treating of unsaturated compounds with a t-aliphatic hydroperoxide. As examples of such t-aliphatic hydroperoxides may be mentioned those t-aliphatic hydroperoxides having 4 to 20 carbon atoms in the hydrocarbon portion of the molecule. Specific examples of the t-aliphatic hydroperoxides are: t-butyl hydroperoxide, t-amyl hydroperoxide, t-hexyl hydroperoxide and the like. Other t-aliphatic hydroperoxides in the same homologous group may be used but the invention is not to be limited to these specific examples given.

The amounts of the unsaturated compound and the aliphatic hydroperoxide employed are in the ratio of at least about 1:1. Greater ratios than about 1:1 may be used but 1:1 will give stoichiometric results.

The present invention will be further illustrated by the following examples:

Example I 2.05 parts of 2,6-di-t-butyl phenol and 0.49 part of t-butyl hydroperoxide containing about 91.7% of the theoretical amount of active oxygen were dissolved in 63 volumes of anhydrous benzene and the solution was bubbled with hydrogen chloride gas for 5 minutes, sealed under nitrogen, and allowed to stand in the dark for approximately 5 days. After this period of time, the reactant mixture was then washed in succession with 30 volumes of water and two 20-volume portions of 1 N aqueous sodium carbonate solution. The organic moiety was extracted with two 10-volume portions of diethyl ether and the combined organic phases were washed with 25 volumes of saturated aqueous sodium chloride solution, and then dried over a drying agent, commonly known as Drierite, and evaporated at room temperatures (25° C.) under pressures of 5–10 mm. Hg. Analysis of the residual oil by gas chromatography showed that it consisted largely of 2,6-di-t-butyl-4-chlorophenol. The conversion of the chlorophenol based on t-butyl hydroperoxide was 59 mol percent with a selectivity of about 95%.

Example II

A mixture of 1.03 parts of 2,6-di-t-butylphenol and 1.10 parts of 2,6-di-t-butyl-p-cresol and 0.49 part of t-butyl hydroperoxide containing 91.7% of the theoretical amount of active oxygen in 64 volumes of anhydrous benzene was bubbled with gaseous hydrogen chloride for 5 minutes, sealed under nitrogen, and allowed to stand in the dark for approximately 6 days. The reactant mixture was then treated as described in Example I and 2.06 parts of product were obtained which by gas chromatography was found to consist of 4 major constituents which were 2,6-di-t-butylphenol, 2,6-di-t-butyl-4-chlorophenol, 2,6-di-t-butyl-p-cresol and 2-t-butyl-6-chloro-p-cresol. The conversions to 2,6-di-t-butyl-4-chlorophenol and 2-t-butyl-6-chloro-p-cresol based on the t-butyl hydroperoxide employed were 31 mol percent and 20 mol percent, respectively, at about 95% selectivity.

The foregoing examples show that a new chlorination reaction using hydrogen chloride as a source of chlorine has been discovered which reaction proceeds under surprisingly mild conditions, that is, liquid phase and temperatures in the range from about 0° C. to about 100° C. with extremely high selectivity. Thus, the method involves treatment of an unsaturated compound with a hydroperoxide in the presence or absence of an inert solvent with gaseous hydrogen chloride.

Without limiting the invention, the following is a possible mechanism explaining the reaction: It is believed that the mechanism involves reaction of the hydroperoxide with hydrogen chloride to generate t-btuyl hypochlorite and/or chlorine, and possibly hypochlorous acid, followed by reaction by either or both of these species with the unsaturated compound. As pointed out supra, the new chlorination technique is applicable to unsaturated compounds of the type illustrated.

Where the unsaturated compound is an aromatic hydrocarbon, the compound serves as its own solvent and an extraneous solvent is not required. However, where the compound is an aromatic hydrocarbon, the temperature used should be in the upper part of the range given since unsaturated compounds, such as phenol, are more reactive than the aromatic hydrocarbons. Thus, when aromatic hydrocarbons are treated in accordance with the present invention, temperatures from about 60° C. to about 100° C. should be used. Also, when an aromatic hydrocarbon solvent is used and another unsaturated compound is one of the reactants, temperatures will be in the lower part of the range. Under these conditions, the aromatic hydrocarbon acts as an inert solvent.

The time for reaction at temperatures within the range from 0° C. to 100° C. may range from about 0.5 to about 144 hours.

The present invention is quite useful in that the chlorinated compounds may be used as disinfectants, solvents, paint thinners or may be used as intermediates in the preparation of other organic compounds, for example, introduction of a chlorine atom into the molecule makes otherwise unreactive matter reactive for introduction of other reactive groups.

The nature and objects of the present invention having been completely described and illustrated, and the best mode contemplated set forth, what I wish to claim as new and useful and secure by Letters Patent is:

1. A method for chlorinating a compound having sites susceptible to chlorination selected from the group consisting of the aromatic hydrocarbons boiling within the range from about 80° C. to about 300° C., phenol, cresol, xylenol, 2,6-di-t-butylphenol, 2,6-di-t-butyl-p-cresol, anisole, aniline, toluidine, and xylidine which comprises:

treating said compound in the liquid phase at a temperature within the range from about 0° C. to about 100° C. for a time within the range from about 0.5 to about 144 hours in the presence of hydrogen chloride with a t-aliphatic hydroperoxide having 4 to 20 carbon atoms in the hydrocarbon portion of the molecule to form a chlorinated derivative of said compound; and recovering said chlorinated derivative.

2. A method in accordance with claim 1 in which the compound is benzene.

3. A method in accordance with claim 1 in which the compound is a phenol.

4. A method in accordance with claim 3 in which the phenol is 2,6-di-t-butylphenol.

5. A method in accordance with claim 1 in which the compound and the aliphatic hydroperoxide are in a ratio of at least about 1:1.

6. A method in accordance with claim 1 in which the aliphatic hydroperoxide is t-butyl hydroperoxide.

7. A method in accordance with claim 8 in which the chlorinated derivative is recovered by evaporation of the solvent.

8. A method in accordance with claim 1 in which the treatment is conducted in a solvent selected from the group consisting of aromatic hydrocarbons boiling within the range of about 80° C. to about 300° C., paraffinic hydrocarbons boiling within the range of about 60° C. to about 300° C., chloroform, carbon tetrachloride, perchloroethylene, methylene chloride, nitrobenzene, and naphthenic hydrocarbons which are liquid under said treating temperatures.

9. A method in accordance with claim 3 in which the compound is 2,6-di-t-butyl-p-cresol.

10. A method in accordance with claim 1 in which the hydrogen chloride is introduced as a gas.

References Cited

UNITED STATES PATENTS

| | | | |
|---|---|---|---|
| 2,440,800 | 5/1948 | Hanford et al. | 260—652 |
| 3,270,091 | 8/1966 | Spivack | 260—623 |

OTHER REFERENCES

Harvey et al., J. Chem. Soc., London (1961) pp. 3604–10.

BERNARD HEFLIN, *Primary Examiner.*

W. B. LONE, *Assistant Examiner.*

U.S. Cl. X.R.

260—578, 612, 649, 650